United States Patent
Boudreau

(10) Patent No.: US 6,539,270 B2
(45) Date of Patent: Mar. 25, 2003

(54) MACHINE MODELS ASSEMBLY INCLUDING BIN ACCESS CONTROL

(75) Inventor: Dale E. Boudreau, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 196 days.

(21) Appl. No.: 09/754,735

(22) Filed: Jan. 4, 2001

(65) Prior Publication Data

US 2002/0087226 A1 Jul. 4, 2002

(51) Int. Cl.⁷ .................................................. B23P 21/00
(52) U.S. Cl. ......................................................... 700/95
(58) Field of Search ............................. 700/95, 96, 97, 700/241, 242, 243

(56) References Cited

U.S. PATENT DOCUMENTS

| | | | |
|---|---|---|---|
| 4,827,423 A | | 5/1989 | Beasley et al. ............. 364/468 |
| 4,894,908 A | * | 1/1990 | Haba et al. .................... 29/711 |
| 5,279,445 A | * | 1/1994 | Fisher et al. .................... 222/1 |
| 5,530,857 A | | 6/1996 | Gimza ......................... 395/600 |
| 5,768,133 A | | 6/1998 | Chen et al. ............ 364/468.01 |
| 6,011,999 A | * | 1/2000 | Holmes ....................... 312/215 |

* cited by examiner

*Primary Examiner*—Leo Picard
*Assistant Examiner*—Michael D. Masinick
(74) *Attorney, Agent, or Firm*—Tallam I. Nguti

(57) ABSTRACT

A machine models assembly workstation is provided for selectively assembling a variety of different machine parts to different machine models having different model identification numbers. The workstation includes a machine model assembly area for holding each different machine model during parts assembly; a machine travel path to, and from, the machine model assembly area; and a plurality of bins located at the machine model assembly area for holding the different machine parts to be selectively assembled to the different models. Each bin of the plurality of bins has walls defining a parts holding chamber, and an access opening into the chamber. A shutter is attached to the walls over the access opening, and has an unlocked open position and a closed locked position. The machine models assembly workstation also includes a bin access control device, responsive to an input machine model identification number, for selectively closing and locking a first set of the plurality of bins, and for automatically selecting, unlocking and opening a second set of the plurality of bins, such that the second set of the plurality of bins holds only approved machine parts for assembly into a machine having the input machine model identification number, thereby enabling fast and accurate assembly while effectively preventing inadvertent operator assembly errors.

15 Claims, 4 Drawing Sheets

MACHINE MODELS ASSEMBLY INCLUDING BIN ACCESS CONTROL

BACKGROUND OF THE INVENTION

This invention relates to manufacturing processes and control, and more particularly to a mixed models machine assembly process including automatic parts bin access control.

Manufacturing processes and manufacturing control systems therefor as disclosed for examples in U.S. Pat. Nos. 4,827,423, 5,530,857 and 5,768,133, are well known. Some such manufacturing processes involve the assembly of a plurality of various different components and parts, at a plural number of different workstations, therefore requiring careful control. Further, some such manufacturing processes involve assembly of such components to anyone of a mixed plurality of different machine models, as well as being processes that are required to adhere to, and are driven by, a need for shorter and shorter order-to-delivery time cycles. Hence there is a strong need for tightly controlling part inventory, parts substitutions, and in particular for preventing operator error by assembling only correct and currently approved parts to the right mixed machine model.

Conventional shop floor or manufacturing process control systems do not discuss or attempt to address such operator error. For example, U.S. Pat. No. 4,827,423 issued May 2, 1989 to Beasley et al, is directed to a Computer Integrated Manufacturing System that includes a plurality of levels of computer control which organize and disseminate information for controlling shop floor level systems. Both scheduling data and data relating to process, product, and material specifications as well as bills of material are generated in an upper level computer system and refined and down loaded as needed to lower level computers controlling the shop floor processes.

U.S. Pat. No. 5,768,133 issued Jun. 16, 1998 to Chen et al is directed to an interactive data processing system and/or method for a manufacturing plant including a shop floor control system. A server contains a data engine for extracting data, a load and transform data unit, and a database management storage unit. Data from the shop floor control system is supplied to the data engine in the server. The data engine can run the shop floor control system. The data engine supplies data received from the shop floor control system to the load and transform data unit. The load and transform data unit supplies data to the database management storage unit where the data is stored in a disk storage unit in storage space allocated to a conventional database management system employed for the purpose of management of data. The database management storage unit supplies data to an interactive graphic user interface.

U.S. Pat. No. 5,530,857 issued Jun. 25, 1996 to Gimza, is directed to a method and system for controlling a shop floor of a factory including an individual workstation or a workstation of an outfit that is associated with the workstation of a corresponding local interface unit. The system includes standard widespread hardware and software and is connected to a local area network in order to be connected with the shop floor control center of the factory.

As pointed out above, conventional shop floor or manufacturing process control systems. as exemplified above, do not discuss or attempt to address such operator error.

SUMMARY OF THE INVENTION

In accordance with the present invention, there is provided a machine models assembly workstation is provided for selectively assembling a variety of different machine parts to different machine models having different model identification numbers. The workstation includes a machine model assembly area for holding each different machine model during parts assembly; a machine travel path to, and from, the machine model assembly area; and a plurality of bins located at the machine model assembly area for holding the different machine parts to be selectively assembled to the different models. Each bin of the plurality of bins has walls defining a parts holding chamber, and an access opening into the chamber. A shutter is attached to the walls over the access opening, and has an unlocked open position and a closed locked position. The machine models assembly workstation also includes a bin access control device, responsive to an input machine model identification number, for selectively closing and locking a first set of the plurality of bins, and for automatically selecting, unlocking and opening a second set of the plurality of bins, such that the second set of the plurality of bins holds only approved machine parts for assembly into a machine having the input machine model identification number, thereby enabling fast and accurate assembly while effectively preventing inadvertent operator assembly errors.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
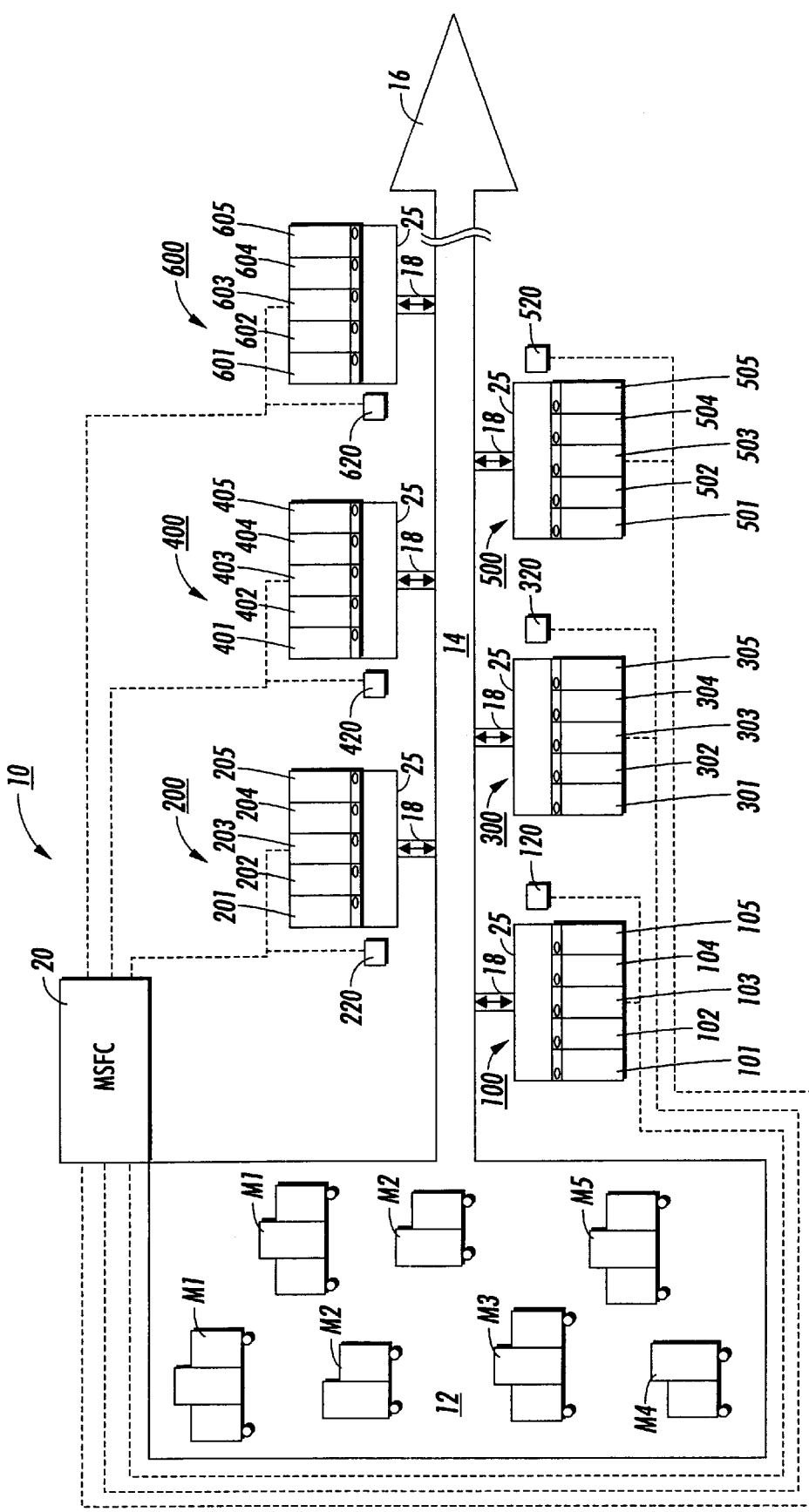
FIG. 1 is a schematic layout of a mixed machine models assembly facility including a plurality of workstations having bin access control in accordance with the present invention.

Referring now to FIG. 1, there is illustrated a layout of a mixed machine models assembly facility 10 including a plurality of workstations shown for example as 100, 200, 300, 400, 500, 600. Each workstation has a plurality of machine parts bins 101, 102, 103, 104, and 105 for example at workstation 100, and 201, 202, 203, 204, and 205 for workstation 200. The same is true of each of workstations 300 to 600 as shown.

The mixed machine models assembly facility 10 also includes a pre-assembly area 12 for holding a plurality of different mixed models M1, M2, M3, M4 for examples of machines to be further assembled with approved machine parts contained within various different bins for example, 301, 302, 303, 304, 305, at the various different workstations 100–600. The mixed machine models assembly facility 10 next includes a machine travel path 14 starting from the pre-assembly area 12 and having a direction 16, and travel connections 18 for machine movement through the facility 10, and to and from the workstations 100–600.

Figure 2:
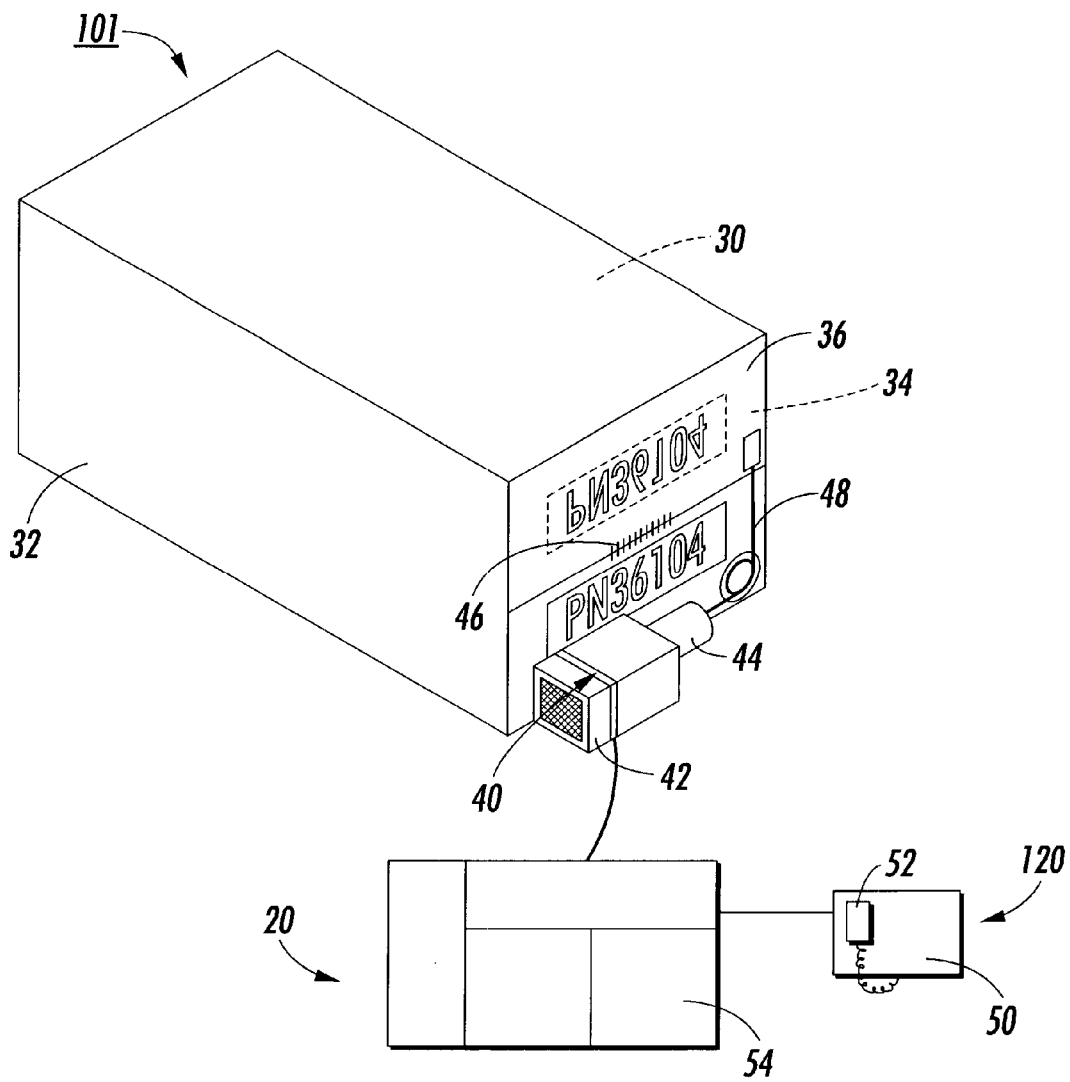
FIG. 2 is a schematic of a single bin of the plurality of bins illustrating a closed and lock position of the bin access control system of the present.
Figure 3:
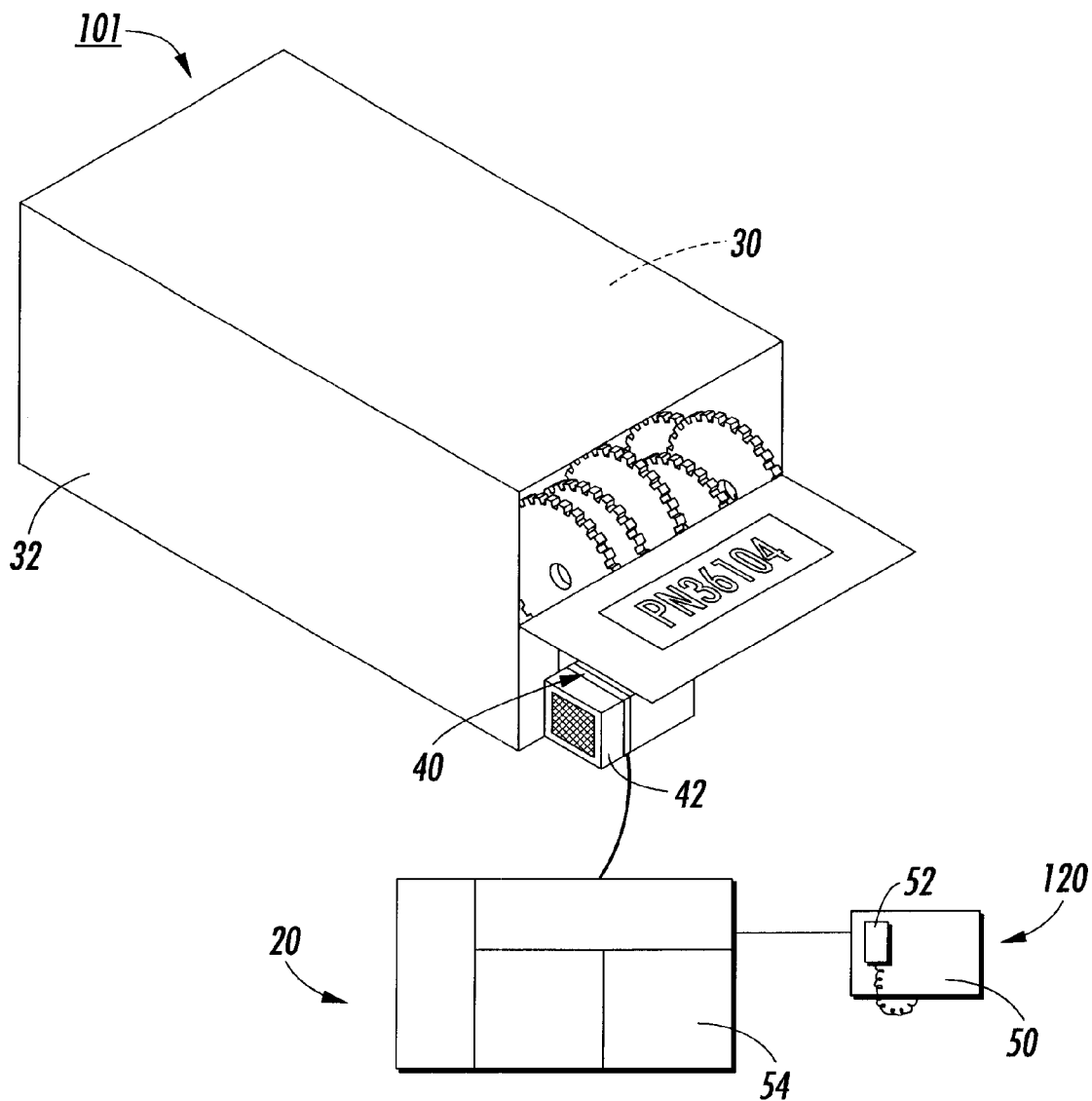
FIG. 3 a schematic of the single bin of FIG. 2 illustrating an unlocked and open position of the bin access control system of the present.
Figure 4:
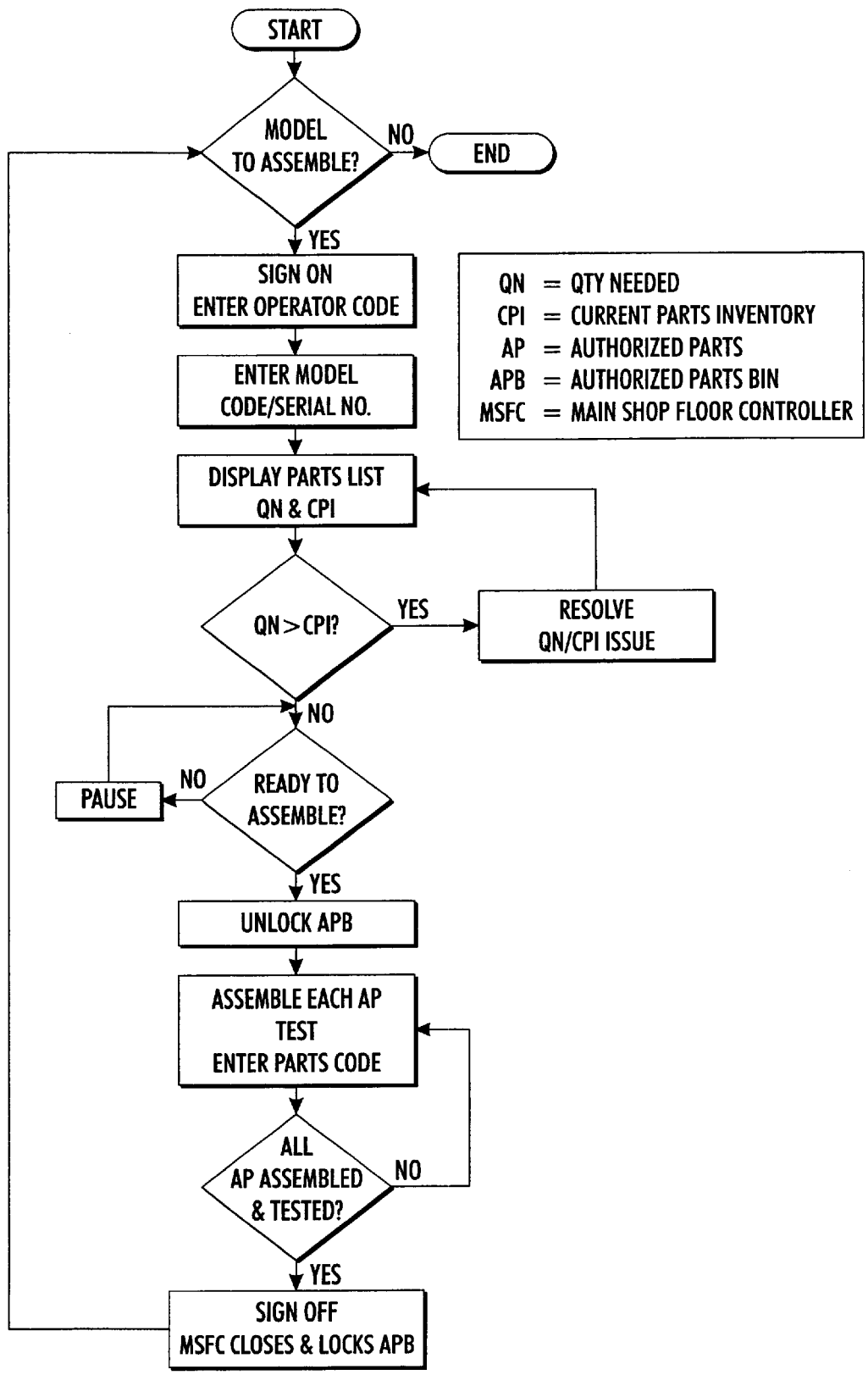
FIG. 4 is a flow chart illustration of the working of the workstation bin access control system of the present invention.

Referring now to FIGS. 1–3, the plurality of machine models assembly workstations 100–600 are each suitable for selectively assembling a variety of different machine parts contained within the various different bins (e.g.) to the different machine models M1–M5. As shown, each workstation 100–600 includes a workstation coma machine model assembly area 25 for holding each different machine model M1–M5 during parts assembly, as well as a machine travel connection 18 from the machine travel path 14 to, and from, the machine model assembly area 25. Each workstation 100–600 also includes its own set of the plurality of parts bins, for example, 101, 102, 103, 104, 105 for holding the different machine parts to be selectively assembled to the different models M1–M5.

Each workstation further includes a bin access control device 120, 220, 320, 420, 520, and 620 respectively, that is responsive to an input machine model identification number. As pointed out above, each different machine model M1–M5 has a different and unique model identification number such as a serial number or a model number. Each such model identification number is preferably marked for scanning and/or other means of machine recognition.

Referring in particular to FIG. 2, each bin, for example 101, 102, 103, 104, 105, of the plurality of bins at each workstation has walls 32 defining a parts holding chamber 30, and an access opening 34 into the holding chamber 30. Each such bin has a shutter 36 attached to the walls over the access opening 34 such that the shutter 36 has an unlocked open position (FIG. 3) and a closed locked position (FIG. 2). Each such bin next includes a programmable powered assembly 40 connected to the shutter 36 for automatically moving the shutter from one to the other of the unlocked open position (FIG. 3) and the closed locked position (FIG. 2). As shown, the programmable powered assembly 40 includes a programmable unit 42, a solenoid 44 and a shutter return member 46 shown in the form of a torsion spring member. The programmable powered assembly 40 further includes a cable and pulley assembly 48 for connecting the solenoid to the shutter 36.

Referring back to FIGS. 1–4, the mixed machine models assembly facility 10 as shown further includes a Main Shop Floor Controller (MSFC) 20 that is connected to the bin access control device 120, 220, 320, 420, 520, and 620 respectively of the workstation 100–600, and to the various different parts bins of each workstation. As connected, the bin access control device 120, 220, 320, 420, 520, and 620 respectively of the workstations 100–600 are each suitable for selectively closing and locking a first set of the plurality of bins, and for automatically selecting, unlocking and opening a second set of the plurality of bins. The second set of the plurality of bins as such will advantageously be bins holding only approved machine parts (AP) for assembly into a machine having the input machine model identification number, thereby enabling fast and accurate assembly while effectively preventing inadvertent operator assembly errors.

Each bin access control device 120, 220, 320, 420, 520, and 620 respectively of the workstations 100–600 preferably includes a programmable computer 50 connected to the MSFC 20, and an input device such as a bar code scanner 52 for inputting a machine model identification number to the computer 50.

Thus in a manufacturing environment driven by shorter and shorter order-to-delivery cycle times, the present invention provides the ability to accurately and tightly control parts inventory and parts assembly which are critical. Such control makes sure that only specific approved parts (AP) are assembled to specific identified machine models. The present invention does so by leveraging information technology and automated mechanical technology as an effective means for restricting inadvertent erroneous access by an operator. This advantageously increases productivity, product quality and customer satisfaction by eliminating rework that would otherwise have been caused by mis-assembly errors.

The present invention utilizes a bar code or numerical scanner 52 that is connected to a database 54 (FIGS. 2 and 3) in the Main Shop Floor Controller (MSFC) 20 for scanning machine model identification numbers, for example a serial number or a model number. Within the database, each such machine model identification number is programmably cross-referenced to all currently approved parts (AP) for that particular model, as well as to every workstation 100–600, and parts bin e.g. 101, 102, 103, 104, 105 containing each such approved part. The MSFC 20 is also then connected to the bin access control 120, 220, 320, 420, 520, 620 of each cross-referenced bin, and is programmed to responsively allow or deny access to any set of the plural number of such bins at the various workstations 100–600.

As such, the MSFC 20 can automatically activate an electromechanical device, such as a solenoid 44 that then opens the bin shutter 36 (FIG. 3) to allow access to all approved parts for a specific model. At the end of all assembly operations at a workstation, an operator activates and resets a button that notifies the MSFC to close and lock all bins, as well as to log all other entered workstation information. This process is more fully disclosed in FIG. 4.

As can be seen, there has been provided a machine models assembly workstation is provided for selectively assembling a variety of different machine parts to different machine models having different model identification numbers. The workstation includes a machine model assembly area for holding each different machine model during parts assembly; a machine travel path to, and from, the machine model assembly area; and a plurality of bins located at the machine model assembly area for holding the different machine parts to be selectively assembled to the different models. Each bin of the plurality of bins has walls defining a parts holding chamber, and an access opening into the chamber. A shutter is attached to the walls over the access opening, and has an unlocked open position and a closed locked position. The machine models assembly workstation also includes a bin access control device, responsive to an input machine model identification number, for selectively closing and locking a first set of the plurality of bins, and for automatically selecting, unlocking and opening a second set of the plurality of bins, such that the second set of the plurality of bins holds only approved machine parts for assembly into a machine having the input machine model identification number, thereby enabling fast and accurate assembly while effectively preventing inadvertent operator assembly errors.

While the embodiment of the present invention disclosed herein is preferred, it will be appreciated from this teaching that various alternative, modifications, variations or improvements therein may be made by those skilled in the art, which are intended to be encompassed by the following claims:

What is being claimed is:

1. A machine models assembly workstation for selectively assembling a variety of different machine parts to different machine models having different model identification numbers, the workstation comprising:
(a) a machine model assembly area for holding each different machine model during parts assembly;
(b) a machine travel path to, and from, said machine model assembly area;
(c) a plurality of bins, including a first set of plural bins and a second set of plural bins holding only approved parts to be assembled on each different model, all located at said machine model assembly area for holding the different machine parts to be selectively assembled to the different models, each bin of said plurality of bins having:
 (i) walls defining a parts holding chamber, and an access opening into said chamber;
 (ii) a shutter attached to said walls over said access opening, and having an unlocked open position and a closed locked position; and
 (iii) a bin access control means, responsive to an input machine model identification number, for selectively closing and locking said first set of said plural bins, and automatically selecting, unlocking and opening said second set of said plural bins holding only approved machine parts for assembly into a machine having said input machine model identification number, thereby enabling fast and accurate assembly of only approved machine parts and effectively preventing inadvertent operator assembly errors.

2. The machine models assembly workstation of claim 1, including a programmable powered means connected to said shutter for automatically moving said shutter from one to the other of said unlocked open position and said closed locked position.

3. The machine models assembly workstation of claim 1, wherein said bin access control means include a programmable controller and an input device for inputting a machine model identification number.

4. The machine models assembly workstation of claim 2, wherein said programmable powered assembly includes a programmable unit, a solenoid and a shutter return member.

5. The machine models assembly workstation of claim 3, wherein said input means comprises a scanner for scanning the model identification number of each machine model about to be assembled at the workstation.

6. The machine models assembly workstation of claim 4 wherein said shutter return member is a torsion spring member.

7. The machine models assembly workstation of claim 4, wherein said programmable powered assembly further includes a cable and pulley assembly for connecting said solenoid to said shutter.

8. A machine mixed models assembly facility comprising:
 a first area for holding a plurality of different mixed models of a machine to be further assembled with approved machine parts;
 a machine travel path starting from said first area and having a direction and connections for machine movement; and
 a plurality of machine models assembly workstations for selectively assembling a variety of different machine parts to different machine models having different model identification numbers, each of said workstation including:
 (a) a machine model assembly area for holding each different machine model during parts assembly;
 (b) a machine travel connection from said machine travel path to, and from, said machine model assembly area;
 (c) a plurality of bins, including a first set of plural bins and a second set of plural bins holding only approved parts to be assembled on each different model, all located at said machine model assembly area for holding the different machine parts to be selectively assembled to the different models, each bin of said plurality of bins having:
 (i) walls defining a parts holding chamber, and an access opening into said chamber;
 (ii) a shutter attached to said walls over said access opening, and having an unlocked open position and a closed locked position; and
 (iii) a bin access control means, responsive to an input machine model identification number, for selectively closing and locking said first set of said plural bins, and automatically selecting, unlocking and opening said second set of said plural bins holding only approved machine parts for assembly into a machine having said input machine model identification number, thereby enabling fast and accurate assembly of only approved machine parts and effectively preventing inadvertent operator assembly errors.

9. The machine models assembly workstation of claim 1, wherein said bin access control means is cross-referenced to a main shop floor controller database for each different machine model list of approved parts.

10. The machine mixed models assembly facility of claim 8, wherein said bin access control means is cross-referenced to a main shop floor controller database for each different machine model list of approved parts.

11. A method of selectively assembling a variety of different machine parts to different machine models having different model identification numbers, the method comprising:
(a) moving a particular machine model of a mix of different such models into a work area;
(b) inputting an operator code into a workstation controller in said work area;
(b) inputting into said workstation controller a machine model identification number for said particular machine model;
(c) displaying on a workstation display unit a parts list, and parts information including a quantity of each part needed and current inventory thereof, for each approved part for assembly into said particular machine model;
(d) comparing said displayed quantity needed information with said current inventory information;
(e) automatically, and responsively to said inputted machine model identification number, selectively unlocking and opening a set of plural parts storage bins, of a plurality of said storage bins, holding only approved machine parts for assembly into said particular machine model; and
(f) assembling said approved machine parts to said particular machine model from said set of unlocked parts storage bins, thereby enabling fast and accurate assembly of only approved machine parts and effectively preventing inadvertent operator assembly errors.

12. The method of claim 11, wherein comparing said displayed quantity needed information with said current inventory information includes resolving a parts shortage where said quantity needed exceeds said current inventory value.

13. The method of claim 11, wherein assembling said approved machine parts includes testing after each assembled part.

14. The method of claim 11, including logging results from each assembled part.

15. The method of claim 11, including cross-referencing said inputted machine model identification number with a main shop floor controller database for each different machine model list of approved parts.

* * * * *